(12) United States Patent
Kwon et al.

(10) Patent No.: US 10,942,029 B2
(45) Date of Patent: Mar. 9, 2021

(54) TRACKING A TARGET USING MULTIPLE TRACKING SYSTEMS

(71) Applicant: The Boeing Company, Chicago, IL (US)

(72) Inventors: Hyukseong Kwon, Thousand Oaks, CA (US); David W. Payton, Calabasas, CA (US); Chong Ding, Riverside, CA (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 15/476,208

(22) Filed: Mar. 31, 2017

(65) Prior Publication Data

US 2018/0128625 A1  May 10, 2018

Related U.S. Application Data

(63) Continuation-in-part of application No. 15/343,990, filed on Nov. 4, 2016, now Pat. No. 10,606,266.

(51) Int. Cl.
*G01C 21/20* (2006.01)
*G05D 1/10* (2006.01)
*G05D 1/00* (2006.01)

(52) U.S. Cl.
CPC .......... *G01C 21/20* (2013.01); *G05D 1/0094* (2013.01); *G05D 1/104* (2013.01)

(58) Field of Classification Search
CPC ....... G01C 21/20; G05D 1/104; G08G 5/0078
See application file for complete search history.

(56) References Cited

U.S. PATENT DOCUMENTS

| 7,420,501 B2* | 9/2008 | Perl ...................... G01S 13/872 342/108 |
| 2007/0111746 A1* | 5/2007 | Anderson ........... H04W 52/223 455/522 |
| 2009/0091490 A1 | 4/2009 | Tu et al. |
| 2011/0048635 A1* | 3/2011 | Mussig et al. .......... B32B 27/32 156/297 |

(Continued)

OTHER PUBLICATIONS

Pakki et al; "Cubature Information Filter and its Applications", 2011 American Control Conference, 2011. (Year: 2011).*

(Continued)

*Primary Examiner* — Regis J Betsch
*Assistant Examiner* — Jeremy A Delozier
(74) *Attorney, Agent, or Firm* — Sage Patent Group

(57) ABSTRACT

A tracking system for tracking a moving target includes a processor and a tracking module that implements an iterative process for tracking the moving target. The iterative process includes receiving sensor data for a current state of the moving target. The process also includes applying a filter engine to the sensor data and a measure of error of a previous prediction of the current state of the target to produce a first estimate for an upcoming state and a first measure of error thereof. The process also includes receiving from at least one second tracking system, at least one second estimate for the upcoming state and second measure of error thereof. The process further includes defining a consensus estimate for the upcoming state and a consensus measure of error thereof using the first estimate and the at least one second estimate and the first and second measure of error thereof.

21 Claims, 6 Drawing Sheets

(56) References Cited

U.S. PATENT DOCUMENTS

| | | | |
|---|---|---|---|
| 2012/0030154 A1 | 2/2012 | Nicholson et al. | |
| 2013/0006576 A1* | 1/2013 | Mathews | G01S 5/16 702/150 |
| 2016/0371530 A1* | 12/2016 | Kwon | G06K 9/3241 |

OTHER PUBLICATIONS

Casbeer, David W., et al.; "Distributed Information Filtering using Consensus Filters," American Control Conference, 2009, pp. 1882-1887.

Li, Wenling, et al.; "Consensus-Based Distributed Multiple Model UKF for Jump Markov Nonlinear Systems," IEEE Transactions on Automatic Control, 2012, pp. 230-236, vol. 57.

Simon, Dan; "From Here to Infinity," Embedded Systems Programming, 2001, 13 Pages.

Yang, Fuwen, et al.; "Mobile Robot Localization Using Robust Extended H∞ Filtering," Journal of Systems and Control Engineering, SAGE Journals, 2009, pp. 1-17.

Kamal, A.T., et al.; "Information Weighted Consensus Filters and their Application in Distributed Camera Networks," IEEE Transactions on Automatic Control, 2013, pp. 3112-3125, vol. 58.

Olfati-Saber, Reza, "Kalman-Consensus Filter: Optimality, Stability, and Performance," IEEE Conference on Decision and Control, 2009, pp. 7036-7042.

K. Pakki et aL, "Square Root Cubature Information Filter", IEEE Sensors Journal, vol. 13, No. 2, Feb. 2013, pp. 150-758.

K. Pakki et al., "Cubature H(Infinity) Information Filter, European Control Conference, Zurick Switzerland, Jul. 17-19, 2013, pp. 2639-2644.

V.P. Bhuvana et aL, "Distributed Object Tracking based on Square Root Cubature H-infinity Information Filter", IEEE, 2014, pp. 1-6.

* cited by examiner

TRACKING A TARGET USING MULTIPLE TRACKING SYSTEMS

CROSS-REFERENCE TO RELATED APPLICATIONS

This application is a continuation-in-part of U.S application Ser. No. 15/343,990, filed Nov. 4, 2016, now U.S. Pat. No. 10,606,266, issued Mar. 31, 2020, which is assigned to the same assignee as the present application and is incorporated herein by reference.

FIELD

The present disclosure relates generally to tracking a target moving between states in an environment and more particularly to tracking a moving target using multiple tracking or surveillance systems.

BACKGROUND

In the context of tracking objects or targets, surveillance platforms are utilized in the air, sea or on the ground, to provide accurate locations and paths of targets that are observed by the platforms. This is particularly challenging when the objects or targets being tracked are moving targets and their paths are not strictly linear. Current tracking systems compromise accuracy as a result of using linearized approximations to predict object paths which has a tendency to overweigh noise or outlier readings. Furthermore, in instances that involve non-linear paths, the current tracking systems fail to provide an efficient means for sharing information between surveillance platforms. Therefore, it may be desirable to have a system and method that take into account at least some of the issues discussed above, as well as possibly other issues.

SUMMARY

In accordance with an embodiment, a tracking system for tracking a moving target includes a processor and a tracking module that is executed on the processor to implement an iterative process for tracking the moving target. The iterative process includes a plurality of iterations. Each iteration performs a set of functions including receiving sensor data for a current state of the moving target and applying a filter engine to the sensor data and a measure of error of a previous prediction of the current state of the moving target to produce a first estimate for an upcoming state of the moving target and a first measure of error of the first estimate for the upcoming state. The set of functions also includes receiving from at least one second tracking system also tracking the moving target, at least one second estimate for the upcoming state and second measure of error of the at least one second estimate for the upcoming state. The set of functions further includes defining a consensus estimate for the upcoming state and a consensus measure of error thereof using the first estimate and the at least one second estimate for the upcoming state of the moving target and the first and second measure of error thereof.

In accordance with another embodiment, a system for tracking a moving target includes a plurality of mobile vehicles. Each mobile vehicle includes a tracking system configured to implement an iterative process for tracking the moving target. The iterative process includes a plurality of iterations. Each iteration performs a set of functions including receiving sensor data for the current state of the moving target and applying a filter engine to the sensor data and a measure of error of a previous prediction of the current state of the moving target. The filter engine is configured to produce a first estimate for an upcoming state of the moving target and a first measure of error of the first estimate for the upcoming state. The filter engine is further configured to exclude an outlier from the sensor data and thereby decrease the measure of error of the first estimate for the upcoming state and produce a first adjusted measure of error thereof. The set of functions also includes receiving from at least one second mobile device also tracking the moving target, at least one second estimate for the upcoming state and at least one second adjusted measure of error of the at least one second estimate. The set of functions additionally includes defining a consensus estimate for the upcoming state and a consensus adjusted measure of error thereof from the first estimate and the first adjusted measure of error thereof, and the at least one second estimate and the at least one second adjusted measure of error thereof. The set of functions further includes applying the filter engine to the consensus estimate for the upcoming state and the consensus adjusted measure of error thereof to produce a prediction for the upcoming state and a measure of error thereof.

In accordance with a further embodiment, a method for tracking a moving target includes an iterative process. The iterative process includes a plurality of iterations. Each iteration performs a set of functions including receiving, by a tracking system, sensor data for a current state of the moving target. The set of functions also includes applying, by the tracking system, a filter engine to the sensor data and a measure of error of a previous prediction of the current state of the moving target to produce a first estimate for an upcoming state of the moving target and a first measure of error of the first estimate for the upcoming state. The set of functions additionally includes receiving, by the tracking system, from at least one second tracking system also tracking the moving target, at least one second estimate for the upcoming state and second measure of error of the at least one second estimate for the upcoming state. The set of functions further includes defining, by the tracking system, a consensus estimate for the upcoming state and a consensus measure of error thereof using the first estimate and the at least one second estimate for the upcoming state of the moving target and the first and second measure of error thereof.

In accordance with another embodiment or any of the previous embodiments, the filter engine includes an extended information filter or a cubature information filter. The extended information filter or cubature information filter are applied to the sensor data and the measure of error of the previous prediction of the current state of the moving target to produce the first estimate for the upcoming state of the moving target and the first measure of error of the first estimate for the upcoming state.

In accordance with another embodiment or any of the previous embodiments, the filter engine further includes an H-infinity filter. The H-infinity filter is applied to the sensor data to exclude any outliers in the sensor data and thereby decrease the first measure of error of the first estimate for the upcoming state and to produce a first adjusted measure of error of the first estimate for the upcoming state.

In accordance with another embodiment or any of the previous embodiments, the at least one second tracking system includes a second H-infinity filter and wherein receiving from the at least one second tracking system also tracking the moving target includes receiving the at least one second estimate for the upcoming state and a second adjusted measure of error of the at least one second estimate for the upcoming state produced by the second H-infinity filter. The function of defining the consensus estimate for the upcoming state and the consensus measure of error includes defining the consensus estimate and a consensus adjusted measure of error using the first and the at least one second estimate for the upcoming state of the moving target and the first and second adjusted measure of error thereof.

In accordance with another embodiment or any of the previous embodiments, the set of functions further includes applying the extended information filter or cubature information filter to the consensus estimate for the upcoming state and the consensus adjusted measure of error thereof to produce a prediction for the upcoming state of the moving target and a measure of error thereof. The set of functions additionally includes, in at least one instance, moving at least one of the tracking systems in the environment based on the prediction for the upcoming state of the moving target.

In accordance with another embodiment or any of the previous embodiments, defining the consensus estimate for the upcoming state and the consensus adjusted measure of error thereof includes producing an average of the first estimate and the at least one second estimate for the upcoming state. The average of the first estimate and the at least one second estimate for the upcoming state define the consensus estimate for the upcoming state. Defining the consensus estimate for the upcoming state and the adjusted measure of error thereof also includes producing an average of the first adjusted measure of error and the second adjusted measure of error of the at least one second estimate for the upcoming state. The average of the first adjusted measure of error and the second adjusted measure of error define the consensus adjusted measure of error.

In accordance with another embodiment or any of the previous embodiments, in an iteration of the iteration process in which the current state is a first state of the moving target, applying the filter engine includes applying the extended information filter or the cubature information filter to the sensor data and a null value for the measure of error of the previous prediction of the current state of the moving target.

In accordance with another embodiment or any of the previous embodiments, in an iteration of the iteration process in which the current state is a second or later state of the moving target, applying the filter engine includes applying the extended information filter or the cubature information filter to the sensor data for the current state and to the previous prediction of the current state and the corresponding measure of error thereof.

In accordance with another embodiment or any of the previous embodiments, the set of functions of the iterative process further includes transmitting the first estimate for the upcoming state and the measure of error of the first estimate for the upcoming state to the at least one second tracking system to define another consensus estimate for the upcoming state and another consensus measure of error for the upcoming state.

In accordance with another embodiment or any of the previous embodiments, each of the tracking systems is on a different mobile vehicle.

In accordance with another embodiment or any of the previous embodiments, at least one of the mobile vehicles in the environment is moved based on the prediction for the upcoming state.

In accordance with another embodiment or any of the previous embodiments, the tracking system of each mobile vehicle is configured to perform the set of functions further including receiving data from a system controller that identifies the moving target and sensing the current state of the moving target, wherein the current state of the moving target includes a location and a velocity. The set of functions performed by the tracking system of each mobile vehicle also includes transmitting sensed current state of the moving target to at least one other mobile vehicle of the plurality of mobile vehicles.

In accordance with another embodiment or any of the previous embodiments, the tracking system of each mobile vehicle is configured to perform the set of functions further including receiving the sensed current state of the moving target transmitted by the at least one other mobile vehicle of the plurality of mobile vehicles and estimating an upcoming state of the moving target using the received sensed current state of the moving target.

In accordance with another embodiment or any of the previous embodiments, estimating the upcoming state of the moving target includes applying an extended information filter or the cubature information filter to the sensor data to measure the error of the previous prediction of the current state to produce the estimate for the upcoming state and the measure of the error of the estimate of the previous prediction of the current state; applying an H-infinity filter to the sensor data to exclude the outlier of the sensor data; and applying an information weighted consensus filter to incorporate the sensor data from at least one other mobile device to determine a consensus estimate for the upcoming state of the moving target.

In accordance with another embodiment or any of the previous embodiments, wherein each of the mobile devices is configured to follow the moving target based on the prediction for the upcoming state of the moving target.

In accordance with another embodiment or any of the previous embodiments, further includes excluding an outlier from the sensor data to produce a first adjusted measure of error of the first estimate and a second adjusted measure of error of the at least one second estimate.

In accordance with another embodiment or any of the previous embodiments, wherein defining the consensus estimate for the upcoming state and the consensus measure of error thereof includes defining the consensus estimate and a consensus adjusted measure of error using the first estimate and the at least one second estimate for the upcoming state of the moving target and the first adjusted measure of error and the second adjusted measure of error.

In accordance with another embodiment or any of the previous embodiments, further includes producing a prediction of the upcoming state of the moving target and a measure of error thereof by applying the filter engine to the consensus estimate for the upcoming state and the consensus adjusted measure of error for the upcoming state of the moving target. The set of functions additionally includes moving at least one of the tracking systems based on the prediction for the upcoming state of the moving target.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

DETAILED DESCRIPTION

Figure 1A:
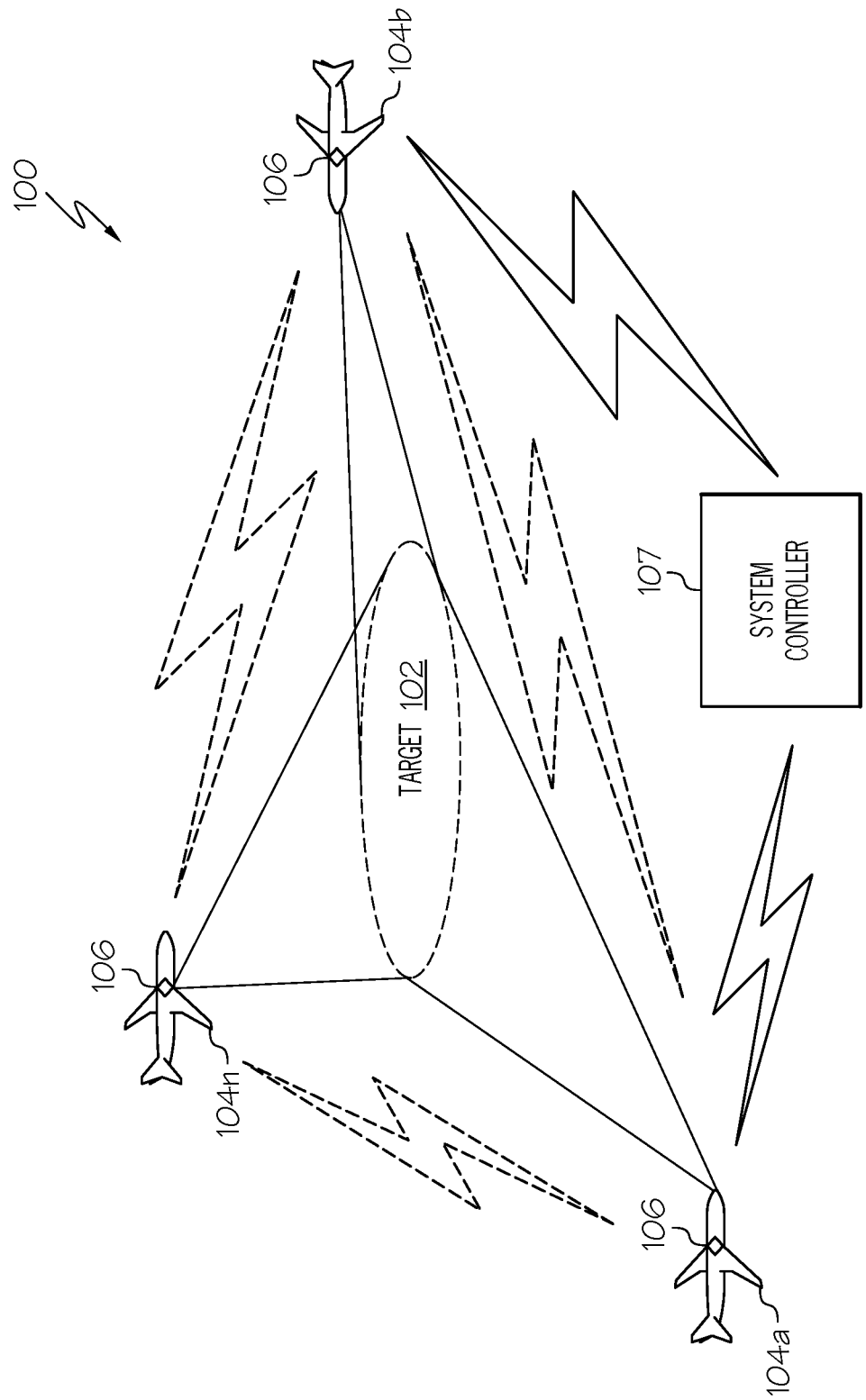
FIG. 1A is an illustration of an example of a system for tracking a moving target using multiple tracking systems in accordance with an embodiment of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to tracking a target moving between states in an environment and, in particular, to tracking the moving target using multiple cooperating surveillance platforms, whether they operate in the air, on the ground or in or on the sea. Tracking data or information processed by each of the multiple surveillance platforms is combined to provide accurate locations and tracks objects or targets the surveillance platforms jointly. The exemplary systems and methods described herein use decentralized processing of the target detection information by each of the surveillance platforms and combines the information by integrating three different types of filtering methods by each surveillance platform to provide a consensus estimate or prediction of location and velocity of the moving target. Consensus filter, H-infinity filter and extended information or cubature information filter methods are integrated to provide the consensus estimate or prediction of location and velocity of the moving target for tracking the moving target. Example implementations will be primarily described in conjunction with applications for target tracking systems. However, it should be understood that example implementations may be utilized in conjunction with a variety of other applications, such as other applications within the aerospace industry and outside of the aerospace industry.

Example implementations of the present disclosure are directed to accurate tracking of targets moving in non-linear paths as the targets are observed from multiple tracking systems (e.g., surveillance or sensing platforms) likely to have noisy observations. To this end, example implementations of the present disclosure provide a system and method for target localization and tracking from multiple sensing platforms. By integrating three different types of filtering methods (e.g., extended or cubature information, H-infinity and consensus filter), target localization and tracking errors are reduced. The system combines object detection information from multiple sensing platforms to achieve consensus estimates for predicting paths of moving targets using fully decentralized processing while matching the accuracy of centralized methods.

In other terms, the system of the present disclosure is configured to predict the upcoming state of a target and a corresponding measure of error thereof independent of communication with a central processing system. That is, the system is configured to predict the upcoming state of the target based only on consensus information derived from estimates for the upcoming state in which the estimates are calculated by the system itself and other systems located proximate thereto.

FIG. 1A is an illustration of an example of a system 100 for tracking a moving target 102 using multiple tracking systems 106 in accordance with an embodiment of the present disclosure. The system 100 includes a plurality of mobile vehicles 104a-104n (e.g., a swarm of unmanned aerial vehicles (UAVs)) for tracking the target 102 including at least first, second and third mobile vehicles 104a, 104b and 104n communicably coupled to one another. In accordance with an implementation, the mobile vehicles 104a-104n are the same type of mobile vehicle. In other implementations, at least some of the mobile vehicles 104a-104n are different types of mobile vehicles. Examples of the mobile vehicles 104a-104n in addition to UAVs, include land craft, watercraft, spacecraft or other vehicles.

In accordance with an example implementation, each of the mobile vehicles 104a-104n includes a tracking system 106. Exemplary tracking systems 200 and 208, either of which are useable for the tracking system 106, are described with reference to FIGS. 2A and 2B, respectively.

In accordance with an exemplary implementation, the system 100 also includes a system controller 107. The tracking system 106 of each mobile vehicle 104a-104n is configured to receive data from the system controller 107 that identifies the moving target 102 and to process instructions for tracking and following the moving target 102. Examples of instructions for following the moving target 102 include but are not necessarily limited to maintaining a particular position above, below, behind, ahead, right or left, etc. relative to the moving target 102; restrictions to maintain a position not closer than or not farther than a particular distance from the moving target 102; maintain a particular altitude relative to the moving target 102; and other instructions related to tracking and following the moving target 102.

In accordance with an example, the system controller 107 is located at a ground station. In accordance with another example, the system controller 107 is onboard one of the mobile vehicle 104a-104n. In accordance with a further example, the system controller 107 is onboard another mobile vehicle, such as a manned aircraft, land craft, watercraft, unmanned spacecraft, etc.

In accordance with example implementations of the present disclosure, the system 100 is configured to perform various functions or operations to track a moving target 102 moving between states in an environment in which the states include at least a current state i and an upcoming state i+1 or next state. The system 100 is configured to track the moving target 102 between the states using an iterative process described in more detail herein. That is, the system 100 is configured to implement a plurality of iterations, each of which includes a number of steps for tracking the moving target 102.

Figure 1B:
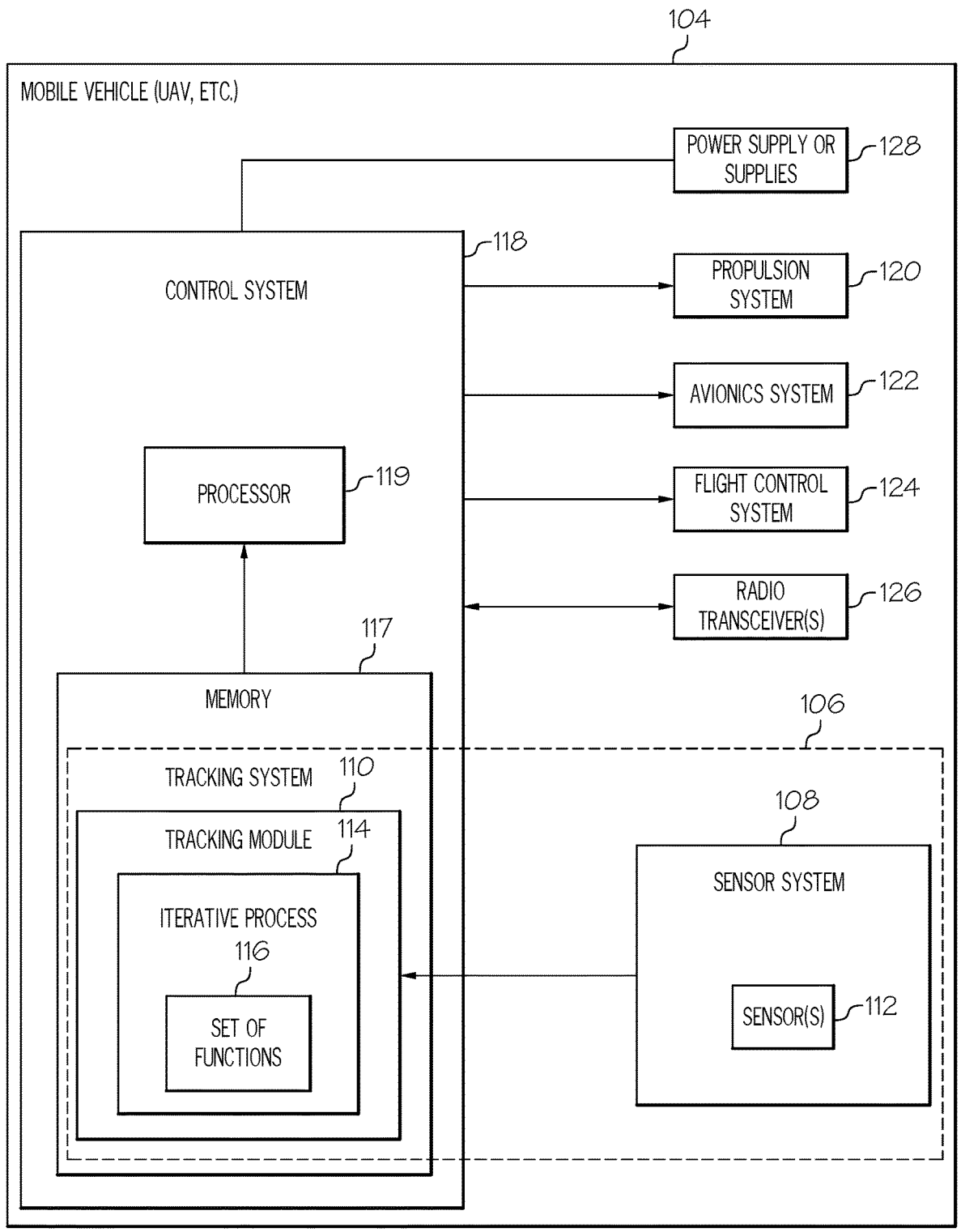
FIG. 1B is a block schematic diagram of an example of a mobile vehicle of FIG. 1A including a tracking system for tracking a moving target in accordance with an embodiment of the present disclosure.

Referring to FIG. 1B, FIG. 1B is a block schematic diagram of an example of a mobile vehicle 104 in FIG. 1A including an exemplary tracking system 106 for tracking a moving target 102 in accordance with an embodiment of the present disclosure. The mobile vehicle 104 is useable for any of the mobile vehicles 104a-104n in FIG. 1A. In accordance with an exemplary implementation, the tracking system 106 includes a sensor system 108 and a tracking module 110. The sensor system 108 includes a plurality of sensors 112 that are configured for measuring or sensing a state of the moving target 102. In accordance with an exemplary implementation, the state of the moving target 102 includes at least location information or data and velocity information or data associated with the moving target 102. The location information includes information for locating the moving target 102 in three-dimensional (3D) space of the environment at a particular time. The velocity information includes speed and a vector or heading of the moving target 102 in the environment or 3D space at a particular time.

Figure 3:
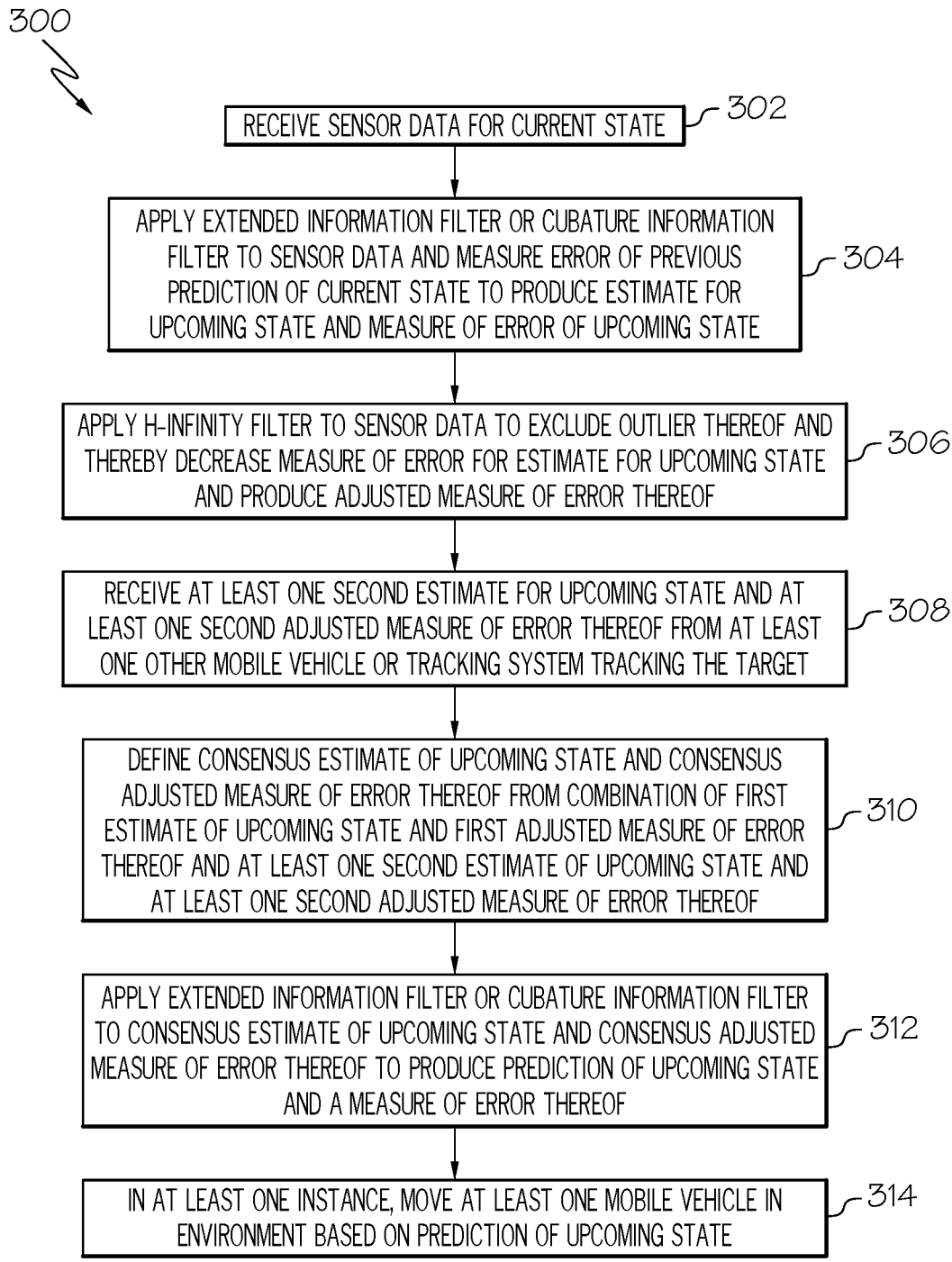
FIG. 3 is a flow chart of an example of a method for tracking a moving target in accordance with an embodiment of the present disclosure.
Figure 4:
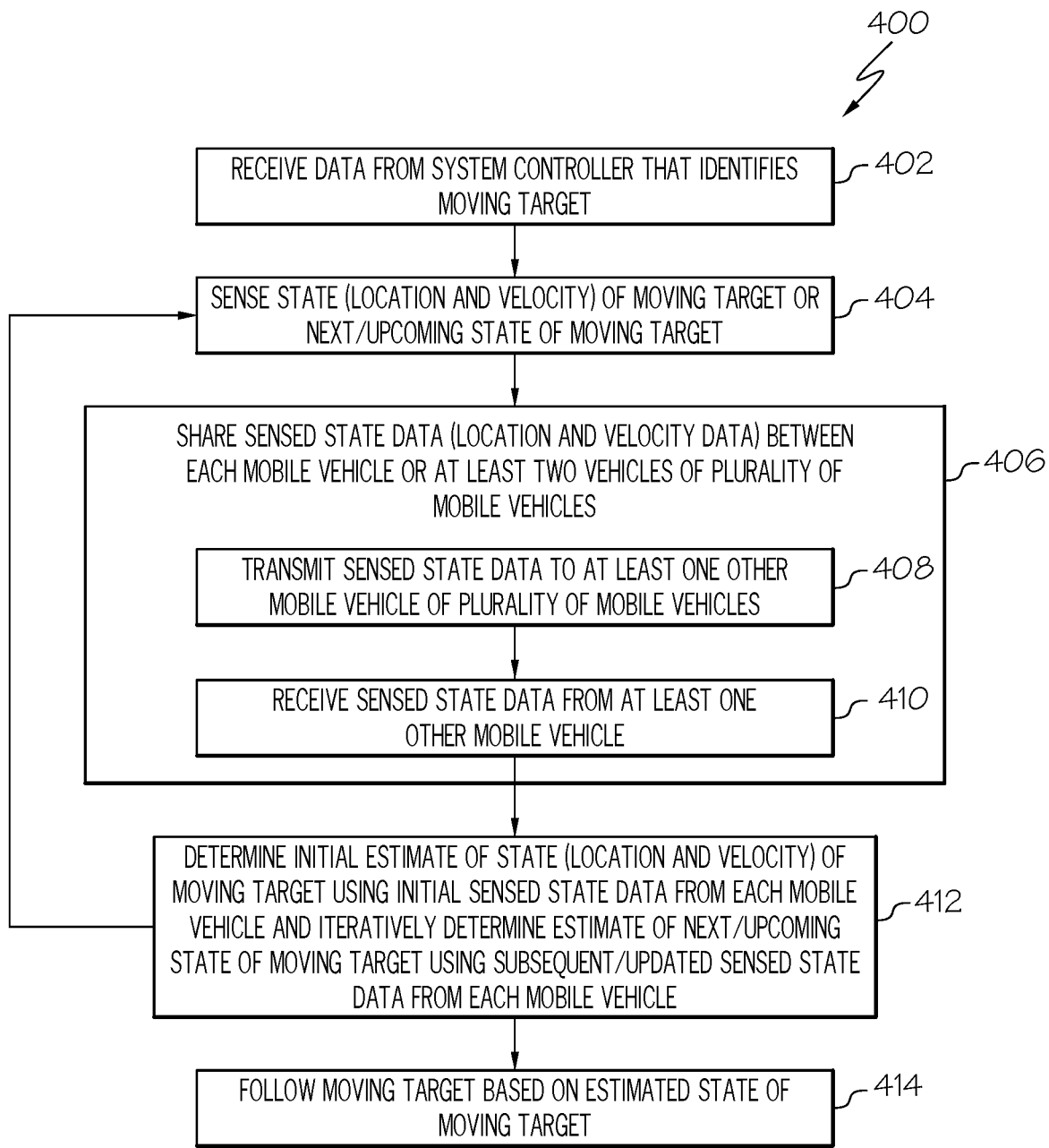
FIG. 4 is a flow chart of an example of another method for tracking a moving target in accordance with another embodiment of the present disclosure.
Figure 5:
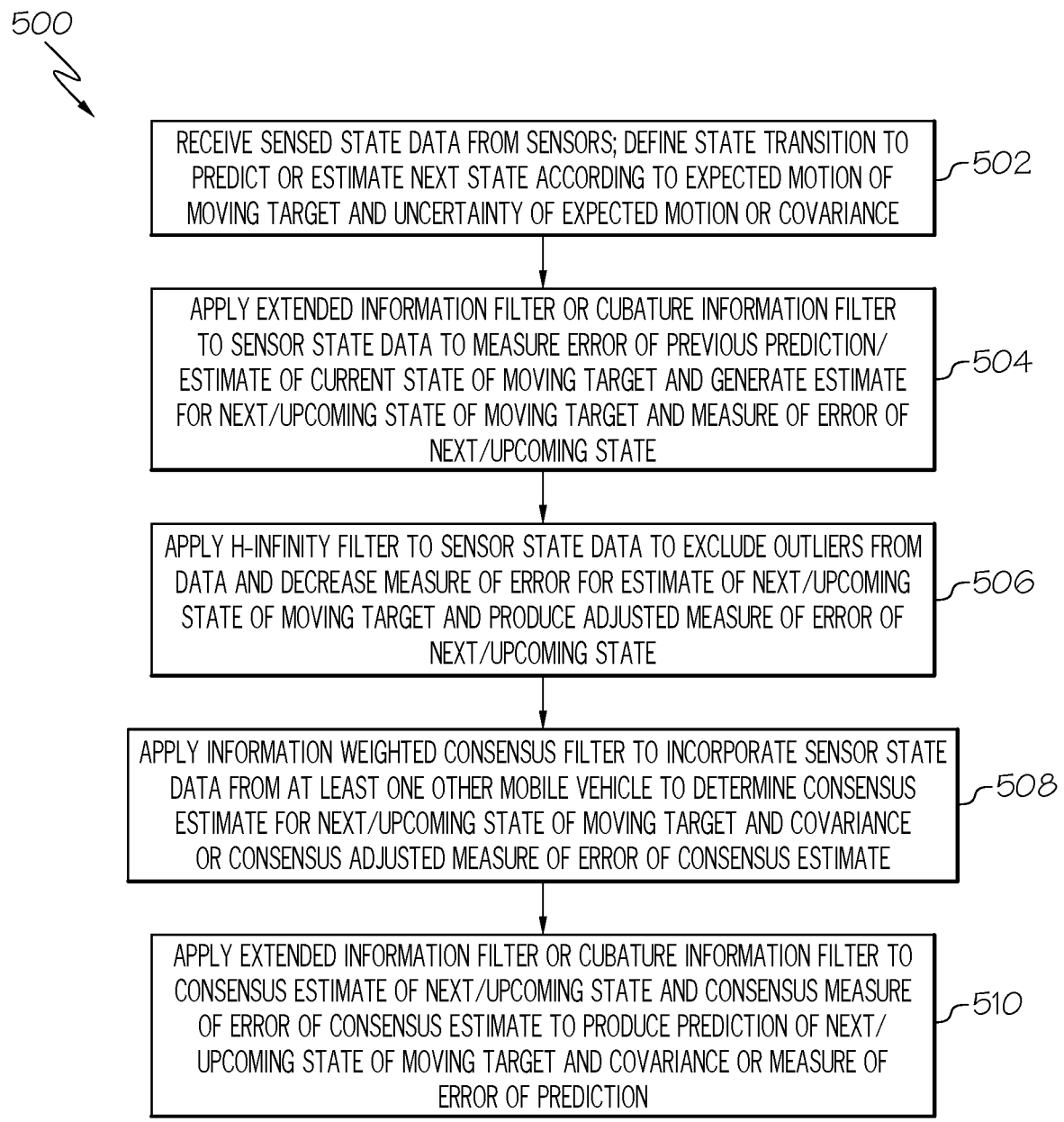
FIG. 5 is a flow chart of an example of a method for determining an initial estimate of a state of a moving target and iteratively determining an estimate of a next/upcoming state of the moving target in accordance with an embodiment of the present disclosure.

As described in more detail herein with reference to FIGS. 3, 4 and 5, the tracking system 106 or tracking module 110 is configured to implement an iterative process 114 for tracking the moving target 102. Each of at least some of the plurality of iterations of the iterative process 114 cause the tracking system 106 to perform a set of functions 116. In accordance with an exemplary implementation, the iterative process 114 and the set of functions 116 are embodied in the tracking module 110 of the tracking system 106. The tracking module 110 is stored on a memory 117 or data storage device. In various instances, the memory may be referred to as a computer-readable storage medium or computer program product. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In accordance with an exemplary implementation, the mobile vehicle 104 includes a control system 118 for controlling operation of the mobile vehicle 104 and the various systems of the mobile vehicle 104. The control system 118 includes a processor 119 or other device for controlling the mobile vehicle 104 and associated systems as described herein. Examples of the systems of the mobile vehicle 104 include but are not necessarily limited to a propulsion system 120, an avionics system 122, flight control system 124 and one or more radio transmitters and receivers or transceivers 126. A power supply 128 or power supplies are also provided for powering the various systems 106-126 of the mobile vehicle 104.

In accordance with an exemplary embodiment, the memory 117, including the tracking module 110 of the tracking system 106, is embodied in the control system 118 as illustrated in FIG. 1B. In other embodiments, the memory 117 is a separate component from the control system 118. The tracking module 110 is run on the processor 119 to perform the iterative process 114 and set of functions 116 as described in more detail with reference to the exemplary embodiments in FIGS. 3, 4 and 5. In the sense that the tracking module 110 runs on the processor 119 to perform the iterative process 114 and set of functions 116, the processor 119 is considered part of the tracking system 106.

Figure 2A:
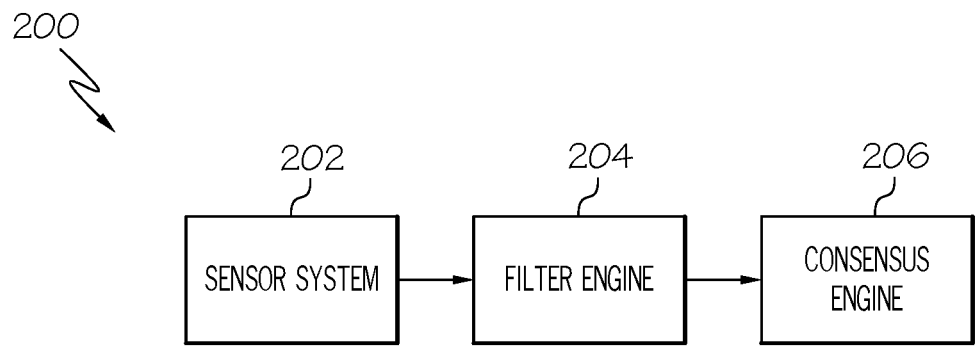
FIG. 2A is a block schematic diagram of an example of a tracking system in accordance with an embodiment of the present disclosure.

Now referring to FIG. 2A, FIG. 2A is a block schematic diagram of an example of a tracking system 200 in accordance with an embodiment of the present disclosure. The tracking system 200 is useable for the tracking system 106 in FIGS. 1A and 1B. The tracking system 200 is configured to perform a number of different functions or operations, either automatically, under direct operator control, or some combination of thereof. In this regard, the tracking system 200 is configured to perform one or more of its functions or operations automatically, that is, without being directly controlled by an operator. Additionally or alternatively, the system is configured to perform one or more of its functions or operations under direct operator control.

The tracking system 200 includes one or more of each of a number of different subsystems (each an individual system) coupled to one another for performing one or more functions or operations. As shown in FIG. 2A, for example, the tracking system 200 includes a sensor system 202, filter engine 204, and consensus engine 206 that may be coupled to one another. The sensor system 202 corresponds to the sensor system 108 in FIG. 1B. Although shown as part of the tracking system 200, the sensor system 202, filter engine 204 or consensus engine 206 may instead be separate from but in communication with the tracking system 200 or 106. It should also be understood that either of the subsystems may function or operate as a separate system without regard to others of the subsystems. And further, it should be understood that the tracking system 200 may include one or more additional or alternative subsystems than those shown in FIG. 2A.

As explained in greater detail below, in accordance with an embodiment, the sensor system 202, filter engine 204 and consensus engine 206 are configured to perform respective functions or operations of the tracking system 200 to track a moving target 102 moving between states in an environment or 3D space that include at least a current state i and an upcoming state i+1. Each state is described by at least a position, heading and speed of the target 102. For each iteration, the sensor system 200 is configured to receive sensor data for the current state i. As previously indicated, the system 100, and more particularly the tracking systems 106 therein, is configured to track the target 102 between the states using an iterative process. That is, the tracking system 200 is configured to implement a plurality of iterations, each of which includes a number of steps for tracking the target 102. In some examples, for each iteration that has a next iteration thereafter, the tracking system is configured to produce a prediction of the upcoming state i+1 before receipt of sensor data for the upcoming state i+1 in a next iteration of the iterative process.

The filter engine 204 is configured to apply a cubature information filter to the sensor data and a measure of error of a previous prediction of the current state i. An example of a filter engine configured to apply an extended information filter will be described with reference to FIG. 2B. Applying the cubature information filter by the filter engine 204 to the sensor data and measure of error of the previous prediction of the current state produces an estimate for the upcoming state i+1 and a measure of error thereof. The measure of error is based on at least noise associated with the sensor data. In some examples, in an iteration in which the current state i is a first state of the target, the filter engine 204 is configured to apply the extend information filter or cubature information filter to the sensor data and a null value for the measure of error of the previous prediction of the current state i.

As described herein, applying a cubature information filter as a component of the filter engine 204 includes generating cubature information for a number n of states of the target including the current state i. The filter engine 204 may generate 2n cubature points in which the cubature points are sample points around the previous prediction of the current state i with respect to the corresponding measure of error thereof. The cubature points are then propagated using a transition matrix to product the estimate for the upcoming state i+1 which may be based on an average of the cubature points. The cubature points may also be utilized to produce the measure of error of the estimate for the upcoming state i+1.

Further, in some examples, in an iteration in which the current state i is a second or later state of the target and the sensor data that describes the current state i has a null value, the filter engine 204 is configured to apply the cubature information filter to the previous prediction of the current state i and the corresponding measure of error thereof. In other terms, in each of these example iterations, the filter engine 204 is configured to produce the estimate for the upcoming state i+1 independent of receiving a previous prediction of the current state or sensor data for a new observation of the target.

After producing the estimate for the upcoming state i+1 and a measure of error thereof, the filter engine 204 is then configured to produce an adjusted measure of error for the upcoming state i+1. More specifically, the filter engine 204 is configured to apply an H-infinity filter to the sensor data to exclude an outlier thereof and thereby decrease the measure of error of the estimate for the upcoming state i+1 in which the decreased measure of error corresponds to the adjusted measure of error for the upcoming state i+1. The H-infinity filter may be utilized to produce conservative measures of error.

As discussed herein, applying an H-infinity filter may include establishing a performance measure based on the states of the target, noise associated with the sensor data, and a measure of error of the noise. Using the performance measure, the filter engine 204 may produce an error bound having a supremum value in which the supremum value may be used to adjust the measure of error of the estimate for the upcoming state i+1 with a tighter bound while excluding outliers of the sensor data.

The consensus engine 206 is configured to receive at least a second estimate for the upcoming state i+1 and a second adjusted measure of error thereof from at least a second mobile vehicle 104 or tracking system 106 that is also tracking the target 102. The consensus is then configured to define a consensus estimate of the upcoming state i+1 and a consensus adjusted measure of error thereof from the estimate and the adjusted measure of error thereof, and the second estimate and the second adjusted measure of error thereof In some implementations, the consensus engine 206 is further configured to transmit the estimate for the upcoming state i+1 and the adjusted measure of error thereof to at least a second tracking system that is also tracking the target. The second tracking system is then configured to thereat define another consensus estimate of the upcoming state i+1 and another consensus adjusted measure of error thereof.

In some example, defining the consensus estimate of the upcoming state i+1 and the consensus adjusted measure of error thereof includes the consensus engine 206 being configured to produce an average of the estimate and the second estimate for the upcoming state i+1 and thereby the consensus estimate of the upcoming state i+1, and produce an average of the adjusted measure of error and the second adjusted measure of error and thereby the consensus adjusted measure of error of the upcoming state i+1.

Thereafter, the filter engine 204 is further configured to apply the extended information filter or cubature information filter to produce a prediction of the upcoming state i+1 and a measure of error thereof. In particular, the filter engine 204 is configured to apply the extended information filter or cubature information filter to the consensus estimate of the upcoming state i+1 and the consensus adjusted measure of error thereof to produce the prediction and measure of error of the prediction of the upcoming state of the moving target 102. In at least one instance, the tracking system 200 or mobile vehicle 104 is configured to move in the environment based on the prediction of the upcoming state i+1. In some examples, the position, heading or speed of the tracking system 200 effects a likelihood of error associated with sensor data received thereat. In these examples, the tracking system 200 is caused to move in the environment, and more particularly, alter the position, heading or speed thereof to reduce the likelihood of error associated with sensor data for the upcoming state i+1 that the sensor system 202 receives in a next iteration of the iterative process.

It should be noted that although the example implementations herein are discussed with reference to a second tracking system that is also tracking the target 102, the consensus engine 206 may receive a plurality of estimates for the upcoming state i+1 and adjusted measures of error thereof from a respective plurality of tracking systems 106, 200 that are also tracking the target and include the first and second tracking system. In these examples, the consensus engine 206 is configured to define the consensus estimate of the upcoming state i+1 and a consensus adjusted measure of error thereof from the plurality of estimates for the upcoming state i+1 and adjusted measures of error thereof.

Figure 2B:
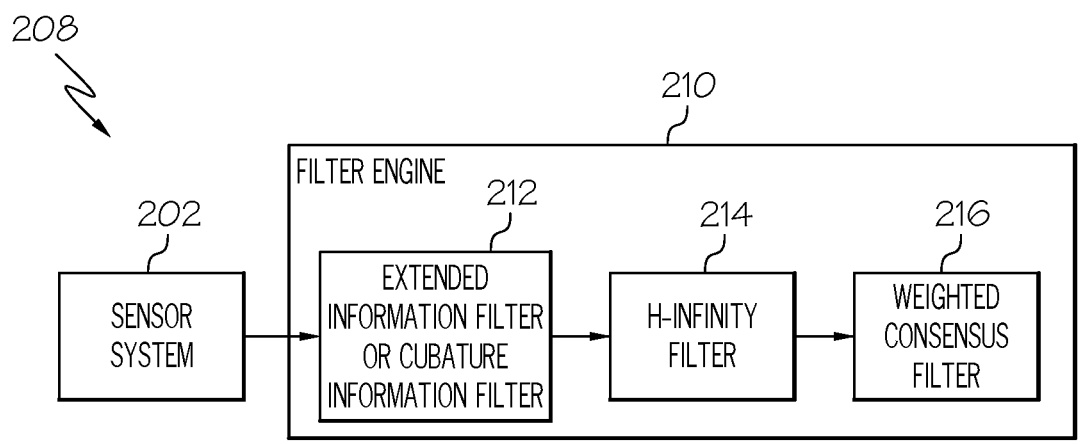
FIG. 2B is a block schematic diagram of another example of a tracking system in accordance with another embodiment of the present disclosure.

Referring to FIG. 2B, FIG. 2B is a block schematic diagram of another example of a tracking system 208 in accordance with another embodiment of the present disclosure. In accordance with other exemplary implementations, the tracking system 208 is used for the tracking system 106 in FIGS. 1A and 1B. The tracking system 208 includes a sensor system 202 and a filter engine 210. The sensor system 202 is the same as that described with respect to FIG. 2A and is the same or similar to the sensor system 108 in FIG. 1B. The filter engine 210 includes an extended information filter 212, an H-infinity filter 214 and a weighted consensus filter 216. The extended information filter 212 operates similar to the cubature information filter described with reference to FIG. 2A. The H-infinity filter 214 operates similar to the H-infinity filter described with reference to FIG. 2A and the weighted consensus filter 216 operates similar to the consensus engine 206.

The filter engine 210 is configured to apply the extended information filter 212 to the sensor data and a measure of error of a previous prediction of the current state i. Based thereon, the filter engine 210 is configured to produce an estimate for the upcoming state i+1 and a measure of error thereof. As previously described, the measure of error is based on at least noise associated with the sensor data. If the current state i is a first state of the target, the filter engine 204 is configured to apply the extended information filter 212 to the sensor data and a null value for the measure of error of the previous prediction of the current state i.

Applying the extended information filter 212 includes generating an uncertainty covariance for a number n of states of the target including the current state i. The filter engine 204 generates an uncertainty covariance around the previous prediction of the current state i with respect to the corresponding measure of error thereof. The uncertainty covariance is then propagated using a transition matrix. The uncertainty covariance is also utilized to produce the measure of error of the estimate for the upcoming state i+1.

In an iteration in which the current state i is a second or later state of the target and the sensor data that describes the current state i has a null value, the filter engine 210 is configured to apply the extended information filter 212 to the previous prediction of the current state i and the corresponding measure of error thereof. In other terms, in each of these example iterations, the filter engine 210 is configured to produce the estimate for the upcoming state i+1 independent of receiving a previous prediction of the current state or sensor data for a new observation of the target.

After producing the estimate for the upcoming state i+1 and a measure of error thereof, the filter engine 210 is then configured to produce an adjusted measure of error for the upcoming state i+1. More specifically, the filter engine 210 is configured to apply the H-infinity filter 214 to the sensor data to exclude an outlier thereof and thereby decrease the measure of error of the estimate for the upcoming state i+1 in which the decreased measure of error corresponds to the adjusted measure of error for the upcoming state i+1. The H-infinity filter 214 is used to produce conservative measures of error.

The weighted consensus filter 216 is configured to operate similar to the consensus engine 206 as described with respect to FIG. 2A.

FIG. 3 is a flow chart of an example of a method 300 for tracking a moving target in accordance with an embodiment of the present disclosure. In accordance with an exemplary implementation, the method 300 is embodied in and performed by each of the tracking system 106 in FIGS. 1A and 1B. The method 300 describes at least some of the set of functions 116 of the iterative process 114. In block 302, sensor data for the current state is received by a first tracking system or first vehicle including the first tracking system. In block 304, an extended information filter or a cubature information filter is applied to the sensor data and a measure of error of a previous prediction of the current state to produce a first estimate for the upcoming state or next state and a first measure of error of the upcoming state. In block 306, an H-infinity filter is applied to the sensor data to exclude an outlier or outliers in the sensor data and thereby decrease the measure of error of the first estimate for the upcoming state and produce an adjusted measure of error of the upcoming or next state.

In block 308, at least one second estimate for the upcoming state and at least one second adjusted measure of error for the upcoming state is received from at least one other mobile vehicle or tracking system of the plurality of mobile vehicles also tracking the moving target. In block 310, a consensus estimate of the upcoming state and a consensus adjusted measure of error thereof is defined from the first estimate of the upcoming state and the first adjusted measure of error thereof and the at least one second estimate of the upcoming state and at least one second adjusted measure of error of the estimated for upcoming state.

In block 312, the extended information filter or cubature information filter is applied to the consensus estimate of the upcoming state and the consensus adjusted measure of error of the upcoming state to produce a prediction of the upcoming state and a measure of error thereof. In block 314, in at least one instance, at least one of the mobile vehicles is moved in the environment based on the prediction of the upcoming state.

Referring now to FIG. 4, FIG. 4 is a flow chart of an example of another method 400 for tracking a moving target in accordance with another embodiment of the present disclosure. In accordance with an exemplary embodiment, the method 400 is embodied in and performed by each of the tracking systems 106 in FIGS. 1A and 1B for tracking a moving target moving between states in an environment including at least a current state and upcoming or next state. The method 400 describes at least some of the set of functions 116 of the iterative process 114.

In block 402, data or information is received from a system controller that identifies a moving target that is to be tracked. In accordance with an embodiment, the tracking system or mobile vehicle receives instructions for tracking or following the moving target. As previously described, examples of instructions for following the moving target include but are not necessarily limited to maintaining a particular position above, below, behind, ahead, right or left, etc. relative to the moving target; restrictions to maintain a position not closer than or not farther than a particular distance from the moving target; maintain a particular altitude relative to the moving target; and other instructions related to tracking and following the moving target.

In block 404, a state of the moving target is sensed in an initial function or operation. The state of the moving target is sensed by the sensor system 108 and plurality of sensors 112 similar to that previously described. In subsequent iterations a next or upcoming state of the moving target is sensed. The sensed state of the moving target includes at least location or position information or data and velocity information or data associated with the moving target. The location information includes information for locating the moving target in three-dimensional (3D) space of the environment at a particular instance of time. The velocity information includes speed and a vector or heading of the moving target in the environment or 3D space.

In block 406, the sensed state data is shared between each mobile vehicle or between the tracking system of each mobile vehicle or between at least two mobile vehicles of a plurality of mobile vehicles. Accordingly, sharing the sensed state data includes, in block 408, transmitting the sensed state data by a particular mobile vehicle to at least one other mobile vehicle of the plurality of mobile vehicles, and in block 410, receiving by the particular mobile vehicle sensed state data from the at least one other mobile vehicle of the plurality of mobile vehicles.

In block 412, for a first or initial estimation of the state of the moving target, an initial estimate of the state of the moving target is determined using the initial sensed state data from at least two mobile vehicles or from each mobile vehicle if all the mobile vehicles share their initial sensed state data of the moving target. An estimate of the next or upcoming state of the moving target is determined based on the estimate of the current initial estimation of the state and measure of the error of the current initial estimation. For each subsequent iteration, an estimate of a next or upcoming state of the moving target is determined using subsequent or updated sensed state data from the at least two mobile vehicles or each mobile vehicle if all mobile vehicles are tracking the moving target. The method 400 returns to block 404 for each subsequent iteration of the process and sharing of subsequent or updated sensed data of the moving target. An example of a method for determining an initial estimate of the state of the moving target and iteratively determining estimates of subsequent next or upcoming states of the moving target is described with reference to FIG. 5.

In block 414, the moving target is followed based on the estimated state of the moving target. All mobile vehicles or at least one mobile vehicle follows the moving target according to the instructions provided by the system controller.

Referring now to FIG. 5, FIG. 5 is a flow chart of an example of a method 500 for determining an initial estimate of a state of a moving target and iteratively determining an estimate of a next/upcoming state of the moving target in accordance with an embodiment of the present disclosure. In accordance with an exemplary embodiment, the method 500 is used for the block 412 in FIG. 4 and the method 500 is embodied in and performed by the tracking system 106 in FIGS. 1A and 1B.

In block 502, sensed state data of the moving target is received. For example, the sensed state data is received from the sensor system 108 of the mobile vehicle 104 by the tracking module 110. As previously discussed, the sensed state data of the moving target includes at least location information or data and velocity information or data associated with the moving target. The velocity information or data includes speed and vector or heading information. Accordingly, the location and velocity of the moving target are being tracked. A state transition is defined to predict the next state according to the moving target's expected motion and considering its uncertainty. In accordance with an example, the state transition is defined by Equation 1:

$$x_k = f(x_{k-1}) + w_{k-1} \qquad \text{Eq. 1}$$

Where $x_k$ (x subscript k) is the kth state of the system or moving target, f( ) is the state transition function, $w_{k-1}$ (w subscript k-1) is Gaussian process noise with zero mean and covariance $Q_k$ (Q subscript k). According to state transition relations, the uncertainty of the state is defined as covariance, and the covariance is acquired from the previous state's covariance weighted by the Jacobian of the transition function (Equation 1) with additional uncertainty covariance. The corresponding covariance in the state is estimated by Equation 2:

$$P_{k|k-1} = M_{f,k-1|k-1} P_{k-1|k-1} M_{f,k-1|k-1}^T + Q_{k-1} \qquad \text{Eq. 2}$$

Where $M_{f,k-1|k-1}$ (M subscript f,k-1|k-1) is the Jacobian of f( ) with respect to $w_{k-1}$ (w subscript k-1).

A new predicted observation $z_k$ (z subscript k) is considered to adjust the predicted or estimated state of the moving target and the corresponding covariance. The predicted observation is acquired from the estimated state and the corresponding measurement of noise and is represented by Equation 3:

$$z_{i,k|k-1} = h(x_{i,k-1|k-1}) + r_{i,k-1} \qquad \text{Eq. 3}$$

Where h( ) is the observation function, and $r_{i,k-1}$ (r subscript i,k-1) is Gaussian measurement noise with zero mean and covariance $R_{i,k-1}$ (R subscript i,k-1). In accordance with an exemplary embodiment, the predicted observation, $z_k$, is in a raw sensor data form. For a sensor or sensors that are cameras, the predicted observation, $z_k$, is an image and $x_k$ (Equation 1) is the location of the detected target in the image.

In block 504, an extended information filter or cubature information filter is applied to the sensor state data to measure error of the previous prediction of the current state of the moving target and generate an estimate for the next state of the moving target along with a measure of error of the next state.

In block 506, an H-infinity filter is applied to the sensor data to exclude outliers and thereby decrease the measure of error or covariance for the estimate of the next or upcoming state and produce an adjusted measure of error or covariance. In accordance with an embodiment, the previously acquired covariance is conservatively restricted for reducing the possibility of outliers. The covariance is adjusted by applying or using a finite horizon extended H-infinity filter. For performing the H-infinity filtering, a modified performance measure is set, which shows the moving target tracking performance. In accordance with an exemplary implementation, Equation 10 is used as the modified performance measure:

$$J_{k-t,k} = \frac{\sum_{i=k-t}^{k-1} \|x_{i|i} - x_{i|i-1}\|^2}{\sum_{i=k-t}^{k} \left( \|w_i\|_{Q_i^{-1}}^2 + \|r_i\|_{R_i^{-1}}^2 \right)} \qquad \text{Eq. 10}$$

Where $w_i$ (w subscript i) and $r_i$ (r subscript i) are the process and measurement noises at time i, respectively, and $R_i$ (R subscript i) is the corresponding measurement noise covariance. The numerator of performance measure $J_{k-t,k}$ (J subscript k-t,k) describes cumulative deviations between predicted states and the corresponding estimated states. The denominator of the performance measure describes the amount of process and measurement noises. Therefore, the smaller the performance measure gets, the better the tracking performance is shown.

In accordance with an exemplary embodiment, the H-infinity filter uses a preset time window which differs from a conventional H-infinity filter. The finite or preset time window H-infinity filter uses a certain time window between time k-t and time k-1 because it prevents division of large numbers when the tracking process continues for a long time period. This prevents information that is old and possibly outdated from being involved in the current estimation of the state of the moving target. With this time window setting, the processing time can always be limited and expected, which is appropriate for real-time processing.

To minimize the state estimation error, the modified performance measure, $J_{k-t,k}$ (J subscript k-t,k) should be bounded by a certain threshold, $\gamma^2$. Under the worst case process noise at time i ($w_i$ (w subscript i)) and measurement noise at time i ($v_i$ (v subscript i)), the modified performance measure is provided according to Equation 11:

$$\sup(J_{k-t,k}) \leq \gamma^2 \qquad \text{Eq. 11}$$

For convenience, $\gamma^2 = \sup J_{k-t,k}$, then the adjusted predicted covariance is the inverse of the adjusted information subtracted by the inverse of the performance measure. So, if the performance measure gets larger, the resulting information increases and the corresponding covariance gets smaller based on Equation 12:

$$P_{k|k-1}^* = (P_{k|k-1}^{-1} - \gamma^{-2}I)^{-1} \qquad \text{Eq. 12}$$

And the corresponding information will be the inverse of the covariance according to Equation 13:

$$y_{k|k-1} = (P_{k|k-1}^*)^{-1} \qquad \text{Eq. 13}$$

Referring back to FIG. 5, in block 508, an information weighted consensus filter is applied to incorporate sensor state data from at least one other mobile vehicle to determine a consensus estimate for the next or upcoming state of the moving target and consensus adjusted measure of error of the consensus estimate or covariance. In accordance with an embodiment, the estimate for the upcoming state of the moving target and adjusted measure of error thereof determined by a plurality of tracking systems or mobile vehicles are shared between the mobile vehicles by transmitting the information from each mobile vehicle to the other mobile vehicle or vehicles. An information weighted consensus filter of each tracking system or mobile vehicle determines a consensus estimate for the next or upcoming state of the moving target and a consensus adjusted measure of error of the consensus estimate similar to that described with reference to block 310 in FIG. 3.

In block 510, the extended information filter or cubature information filter is applied to the consensus estimate and consensus adjusted measure of error thereof to produce a prediction of the next or upcoming state of the moving target and measure of error of the prediction or covariance.

Another information matrix from observation of the moving target is acquired by the sensor system. The information matrix is weighted by the Jacobian of the observation function. An information vector is also acquired from the difference of observations by the different mobile vehicles and the state weighted by the Jacobian of the observation function. The corresponding information matrix corresponds to Equation 14 and information vector corresponds to Equation 15:

$$I_k = M_{h,k|k-1} R^{-1} M_{h,k|k-1}^T \qquad \text{Eq. 14}$$

And $$i_k = M_{h,k|k-1} R^{-1} [v_k + M_{h,k|k-1} x_{k|k-1}] \qquad \text{Eq. 15}$$

Where $v_k = z_k - z_{k|k-1}$, $M_{h,k|k-1}$ is the Jacobian of h( ) with respect to $r_{k-i}$ and R is the covariance of $r_{k-i}$. The consensus matrix and vector will be obtained by summation of state information normalized by the number of consensus-involved sensors and observation information. This information is shared between the mobile vehicles and associated tracking systems to improve the accuracy and robustness of the tracking performance. The consensus matrix and vector are represented by Equations 16 and 17 respectively:

$$V_k = \frac{1}{N_{CSS}} Y_{k|k-1} + I_k \qquad \text{Eq. 16}$$

$$v_k = \frac{1}{N_{CSS}} y_{k|k-1} + i_k \qquad \text{Eq. 17}$$

Where $N_{CSS}$ (N subscript CSS) is the number of sensor information involved in the present consensus sharing and update process and y subscript (k|k-1)=Y subscript (k|k-1) x subscript (k|k-1). Each mobile vehicle's consensus component is shared in the sensor network and updated considering deviations between the consensus information of other mobile vehicles as represented in Equations 18 and 19:

$$V_k(i) = V_k(i) + \Sigma \in (V_k(i) - V_k(j)) \qquad \text{Eq. 18}$$

And $$v_k(i) = v_k(i) + \Sigma \in (v_k(i) - v_k(j)) \qquad \text{Eq. 19}$$

Where i is the identification (ID) of the mobile vehicle or UAV which performs the current processing and j is the ID or IDs of other mobile vehicles which delivered the consensus information to mobile vehicle or UAV i. And $\in$ is a weight for consensus differences. This consensus sharing/update process is repeated multiple times for better convergence with considering processing time and communication delays in the sensor network similar to that described with respect to blocks 404-412 of FIG. 4.

After consensus update through repetitive sharing, the information and its covariance are finally confirmed as represented by Equations 20 and 21:

$$Y_{k|k} = N_{CSS} V_k \qquad \text{Eq. 20}$$

$$y_{k|k} = N_{CSS} v_k \qquad \text{Eq. 21}$$

Eventually, the final estimated state of the moving target at time k is estimated using the consensus matrix and the consensus vector, and the corresponding covariance is the inverse of the final information. The estimated next or upcoming state is represented by Equation 22 and measure of error or covariance of the estimated next or upcoming state is represented by Equation 23.

$$x_{k|k} = \left(\frac{V_k}{v_k}\right)^{-1} \qquad \text{Eq. 22}$$

$$P_{k|k} = (Y_{k|k})^{-1} \qquad \text{Eq. 23}$$

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A tracking system for tracking a moving target, comprising:
 a processor; and
 a tracking module that is executed on the processor to implement an iterative process for tracking the moving target, the iterative process comprising a plurality of iterations, each iteration performing a set of functions comprising:
  receiving sensor data for a current state of the moving target;
  applying a filter engine to the sensor data and a measure of error of a previous prediction of the current state of the moving target to produce a first estimate for an upcoming state of the moving target and a first measure of error of the first estimate for the upcoming state;
  receiving from at least one second tracking system also tracking the moving target, at least one second estimate for the upcoming state and second measure of error of the at least one second estimate for the upcoming state; and
  defining a consensus estimate for the upcoming state and a consensus measure of error thereof using the first estimate and the at least one second estimate for the upcoming state of the moving target and the first and second measure of error thereof; and
  tracking the moving target using the consensus estimate for the upcoming state of the moving target and the consensus measure of error.

2. The tracking system of claim 1, wherein the filter engine comprises an extended information filter or a cubature information filter, the extended information filter or the cubature information filter being applied to the sensor data and the measure of error of the previous prediction of the current state of the moving target to produce the first estimate for the upcoming state of the moving target and the first measure of error of the first estimate for the upcoming state.

3. The tracking system of claim 2, wherein the filter engine further comprises an H-infinity filter, the H-infinity filter being applied to the sensor data to exclude an outlier thereof and thereby decrease the first measure of error of the first estimate for the upcoming state and to produce a first adjusted measure of error of the first estimate for the upcoming state.

4. The tracking system of claim 3, wherein the at least one second tracking system comprises a second H-infinity filter and wherein receiving from the at least one second tracking system also tracking the moving target comprises receiving the at least one second estimate for the upcoming state and a second adjusted measure of error of the at least one second estimate for the upcoming state produced by the second H-infinity filter; and
 wherein defining the consensus estimate for the upcoming state and the consensus measure of error comprises defining the consensus estimate and a consensus adjusted measure of error using the first estimate and the at least one second estimate for the upcoming state of the moving target and the first and second adjusted measure of error thereof.

5. The tracking system of claim 4, wherein the set of functions further comprises:
 applying the extended information filter or the cubature information filter to the consensus estimate for the upcoming state and the consensus adjusted measure of error thereof to produce a prediction for the upcoming state of the moving target and a measure of error thereof; and
 in at least one instance, moving at least one of the tracking systems in an environment based on the prediction for the upcoming state of the moving target.

6. The tracking system of claim 5, wherein defining the consensus estimate for the upcoming state and the consensus adjusted measure of error thereof comprises:
 producing an average of the first estimate and the at least one second estimate for the upcoming state, the average of the first estimate and the at least one second estimate for the upcoming state defining the consensus estimate for the upcoming state; and
 producing an average of the first adjusted measure of error and the second adjusted measure of error of the at least one second estimate for the upcoming state, the average of the first adjusted measure of error and the second adjusted measure of error defining the consensus adjusted measure of error.

7. The tracking system of claim 2, wherein in an iteration in which the current state is a first state of the moving target, applying the filter engine comprises applying the extended information filter or the cubature information filter to the sensor data and a null value for the measure of error of the previous prediction of the current state of the moving target.

8. The tracking system of claim 2, wherein in an iteration in which the current state is a second or later state of the moving target, applying the filter engine comprises applying the extended information filter or the cubature information filter to the sensor data for the current state and to the previous prediction of the current state and a corresponding measure of error thereof.

9. The tracking system of claim 1, wherein the set of functions further comprise transmitting the first estimate for the upcoming state and the measure of error of the first estimate for the upcoming state to the at least one second tracking system to define another consensus estimate for the upcoming state and another consensus measure of error for the upcoming state.

10. The tracking system of claim 1, wherein each tracking system is on a different mobile vehicle.

11. A system for tracking a moving target, comprising:
 a plurality of mobile vehicles, each mobile vehicle comprising a tracking system configured to implement an iterative process for tracking the moving target, the iterative process comprising a plurality of iterations, each iteration performing a set of functions comprising:
  receiving sensor data for a current state of the moving target;
  applying a filter engine to the sensor data and a measure of error of a previous prediction of the current state of the moving target, the filter engine being configured to produce a first estimate for an upcoming state of the moving target and a first measure of error of the first estimate for the upcoming state, and the filter engine being further configured to exclude an outlier from the sensor data and thereby decrease the measure of error of the first estimate for the upcoming state and produce a first adjusted measure of error thereof;

receiving from at least one mobile device also tracking the moving target, at least one second estimate for the upcoming state and at least one second adjusted measure of error of the at least one second estimate;

defining a consensus estimate for the upcoming state and a consensus adjusted measure of error thereof from the first estimate and the first adjusted measure of error thereof, and the at least one second estimate and the at least one second adjusted measure of error thereof; and applying the filter engine to the consensus estimate for the upcoming state and the consensus adjusted measure of error thereof to produce a prediction for the upcoming state and a measure of error thereof.

12. The system of claim 11, further comprising moving at least one of the plurality of mobile vehicles in the environment based on the prediction for the upcoming state.

13. The system of claim 11, wherein the tracking system of each mobile vehicle is configured to perform the set of functions further comprising:
receiving data from a system controller that identifies the moving target;
sensing the current state of the moving target, wherein the current state of the moving target comprises a location and a velocity; and
transmitting the sensed current state of the moving target to at least one other mobile vehicle of the plurality of mobile vehicles.

14. The system of claim 13, wherein the tracking system of each mobile vehicle is configured to perform the set of functions further comprising:
receiving the sensed current state of the moving target transmitted by the at least one other mobile vehicle of the plurality of mobile vehicles; and
estimating the upcoming state of the moving target using the received sensed current state.

15. The system of claim 14, wherein estimating the upcoming state of the moving target comprises:
applying an extended information filter or a cubature information filter to the sensor data to measure the error of the previous prediction of the current state to produce the estimate for the upcoming state and the measure of the error of the estimate of the previous prediction of the current state;
applying an H-infinity filter to the sensor data to exclude the outlier of the sensor data; and
applying an information weighted consensus filter to incorporate the sensor data from at least one other mobile device to determine a consensus estimate for the upcoming state of the moving target.

16. The system of claim 15, wherein each mobile device is configured to follow the moving target based on the prediction for the upcoming state of the moving target.

17. A method for tracking a moving target, the method comprising an iterative process, the iterative process comprising a plurality of iterations each iteration performing a set of functions comprising:
receiving, by a tracking system, sensor data for a current state of the moving target;
applying, by the tracking system, a filter engine to the sensor data and a measure of error of a previous prediction of the current state of the moving target to produce a first estimate for an upcoming state of the moving target and a first measure of error of the first estimate for the upcoming state;

receiving, by the tracking system, from at least one second tracking system also tracking the moving target, at least one second estimate for the upcoming state and second measure of error of the at least one second estimate for the upcoming state; and defining, by the tracking system, a consensus estimate for the upcoming state and a consensus measure of error thereof using the first estimate and the at least one second estimate for the upcoming state of the moving target and the first and second measure of error thereof; and tracking the moving target using the consensus estimate for the upcoming state of the moving target and the consensus measure of error.

18. The method of claim 17, further comprising excluding an outlier from the sensor data to produce a first adjusted measure of error of the first estimate and a second adjusted measure of error of the at least one second estimate.

19. The method of claim 18, wherein defining the consensus estimate for the upcoming state and the consensus measure of error thereof comprises defining the consensus estimate and a consensus adjusted measure of error using the first estimate and the at least one second estimate for the upcoming state of the moving target and the first adjusted measure of error and the second adjusted measure of error.

20. The method of claim 19, further comprising:
producing a prediction of the upcoming state of the moving target and a measure of error thereof by applying the filter engine to the consensus estimate for the upcoming state and the consensus adjusted measure of error for the upcoming state of the moving target; and
moving at least one tracking system based on the prediction for the upcoming state of the moving target.

21. A tracking system for tracking a moving target, comprising:
a processor; and
a tracking module that is executed on the processor to implement an iterative process for tracking the moving target, the iterative process comprising a plurality of iterations, each iteration performing a set of functions comprising:
receiving sensor data for a current state of the moving target;
applying a filter engine to the sensor data and a measure of error of a previous prediction of the current state of the moving target to produce a first estimate for an upcoming state of the moving target and a first measure of error of the first estimate for the upcoming state, wherein the filter engine comprises an extended information filter or a cubature information filter, the extended information filter or the cubature information filter being applied to the sensor data and the measure of error of the previous prediction of the current state of the moving target to produce the first estimate for the upcoming state of the moving target and the first measure of error of the first estimate for the upcoming state;
receiving from at least one second tracking system also tracking the moving target, at least one second estimate for the upcoming state and second measure of error of the at least one second estimate for the upcoming state;
defining a consensus estimate for the upcoming state and a consensus measure of error thereof using the first estimate and the at least one second estimate for the upcoming state of the moving target and the first and second measure of error thereof; and tracking the moving target using the consensus estimate for the upcoming state of the moving target and the consensus measure of error.

* * * * *